UNITED STATES PATENT OFFICE.

GUSTAV GRETHER, OF KOBLENZ, GERMANY.

PARASITICIDE FOR PLANTS.

1,021,095.  Specification of Letters Patent.  Patented Mar. 26, 1912.

No Drawing. Application filed September 18, 1911. Serial No. 650,043.

*To all whom it may concern:*

Be it known that I, GUSTAV GRETHER, a subject of the Emperor of Germany, and a resident of Koblenz, Germany, have invented certain Improvements in Parasiticides for Plants, of which the following is a specification.

The present invention relates to an improved chemical preparation of the kind used for the destruction of animal and vegetable parasites on plants, particularly vines.

The invention consists in the addition, to appropriate liquid or solid sprinkling agents such as water, sulfur, ashes and the like, of phenoxylacetic or cresoxylacetic acid, or mixtures or derivatives of these substances.

A parasiticide which is particularly valuable in the cultivation of vine, for instance, is obtained, according to the invention, by the intense mixing of dry phenoxylacetic acid with sulfur, the mixture being pounded and passed through a sieve having meshes of 1½ millimeters in width. The effect of the treatment of the vine with this preparation may be gathered from the following data: At the time (May) of the first flight of the moth *Cochylis roserana*, vines were sprinkled with a powder of the above description. In the middle of June the sprinkling was repeated. At the end of June and beginning of July the effective value of the treatment was ascertained by counting the developed caterpillars on the grape buds of the plants treated with the above preparation and at the same time on those of the adjacent ones, which had only been treated with pure vineyard sulfur. In 1000 buds of the plants which had been treated with sulfur alone, 700 caterpillars were found. 1000 buds of the plants treated with the acid preparation contained only 420 caterpillars.

In another experimental allotment the results obtained were as follows: In 1000 buds of plants treated with sulfur alone, 102 caterpillars were found, 1000 buds of plants treated with the acid preparation being found to contain only 42 caterpillars. In yet another allotment the difference was 50%. It was moreover found that in all the plants which were treated with sulfur alone, the false mildew Peronospora made its appearance, while in the plants treated with the acid preparation not one of these fungi was found. The latter plants, moreover, were entirely free from the pin worm as well as from other animal and vegetable parasites. No fretting or discoloring of the leaves or of the grapes took place in the plants treated with the acid preparation. Furthermore, these plants distinguish themselves from those treated with sulfur alone by exhibiting a particularly fresh leaf color and fine, healthy-looking fruits. The treatment of the vine with the acid preparation, therefore, prevented entirely the appearance of both Oïdium and Peronospora and reduced the number of caterpillars of *Cochylis roserana* considerably. Sulfur itself is, as is well known, an effective remedy against Oïdium, but it is useless against Peronospora and animal parasites. Only by the addition of phenoxylacetic acid a preparation is obtained which is a remedy not only against Oïdium but also a very effective one against Peronospora and animal parasites. The preparation ought also to be destructive of the Aphides.

The phenoxylacetic acid may be entirely or partly substituted by cresoxylacetic acid or by a combination of the two. Instead of sulfur, other diluents may be employed such as gypsum, soap-powder, talc and the like. Similar results are obtainable by liquids to which phenoxylacetic or cresoxylacetic acid, or a mixture of both, has been added.

The employment of both acids as bacillicides is known. As animal and vegetable parasiticides, however, they have not yet been used, since their destructive qualities in this direction could not be foreseen. A particular merit of these acids is that they are perfectly harmless to human beings so that no danger whatsoever is attached to their employment.

The term diluent is intended to cover active parasiticidal substances as well as inert substances.

I claim:

A parasiticide for plants consisting of phenoxylacetic and cresoxylacetic acids and a diluent.

GUSTAV GRETHER.

Witnesses:
OSKAR RÖSSING,
LOUIS VANDORN.